(12) United States Patent
Long (10) Patent No.: US 12,396,587 B2
(45) Date of Patent: Aug. 26, 2025

(54) INTELLIGENT PRESSURE SOLENOID VALVE

(71) Applicants: Sanqiaohui (Foshan) New Materials Co., Ltd., Guangdong (CN); Foshan Gaopeng New Material Partnership (Limited Partnership), Guangdong (CN)

(72) Inventor: Kewen Long, Guangdong (CN)

(73) Assignees: Sanqiaohui (Foshan) New Materials Co., Ltd., Fashon (CN); Foshan Gaopeng New Material Partnership, Foshan (CN)

( * ) Notice: Subject to any disclaimer, the term of this patent is extended or adjusted under 35 U.S.C. 154(b) by 426 days.

(21) Appl. No.: 17/842,322

(22) Filed: Jun. 16, 2022

(65) Prior Publication Data

US 2023/0404314 A1    Dec. 21, 2023

(51) Int. Cl.
| | | |
|---|---|---|
| *A47J 27/08* | (2006.01) | |
| *F16K 24/04* | (2006.01) | |
| *F16K 27/12* | (2006.01) | |
| *F16K 31/08* | (2006.01) | |
| *F16K 37/00* | (2006.01) | |
| *F16K 49/00* | (2006.01) | |

(52) U.S. Cl.
CPC ........... *A47J 27/0802* (2013.01); *F16K 24/04* (2013.01); *F16K 27/12* (2013.01); *F16K 31/082* (2013.01); *F16K 37/005* (2013.01); *F16K 49/00* (2013.01)

(58) Field of Classification Search
CPC .... A47J 27/0802; A47J 27/0804; A47J 27/09; A47J 27/092; F16K 31/082; F16K 31/084; F16K 24/04; F16K 27/029; F16K 27/12; F16K 37/005; F16K 49/00
USPC .......... 251/129.19, 129.21; 220/202, 203.01, 220/203.23, 203.27, 203.29, 316, 367.1; 126/348, 361.1, 369, 377.1, 389.1
See application file for complete search history.

(56) References Cited

U.S. PATENT DOCUMENTS

| | | | | |
|---|---|---|---|---|
| 981,370 | A * | 1/1911 | Bray | F16K 15/182 137/512 |
| 1,622,672 | A * | 3/1927 | Raymond | F16K 31/0655 251/129.21 |
| 2,208,961 | A * | 7/1940 | Crowley | F16K 27/02 152/DIG. 7 |
| 3,007,672 | A * | 11/1961 | Tischler | F16K 31/0655 251/129.21 |
| 4,838,519 | A * | 6/1989 | Buffet | F16K 31/0606 137/625.25 |

(Continued)

*Primary Examiner* — Kenneth Rinehart
*Assistant Examiner* — Jonathan J Waddy
(74) *Attorney, Agent, or Firm* — Jose Cherson Weissbrot (57) ABSTRACT

An intelligent pressure solenoid valve includes a valve body, an air valve stem and a pressure cap, the valve body is provided with an electromagnetic component and an air vent, the air vent penetrates through the electromagnetic component, the air valve stem passes through the air vent, and the air valve stem, the electromagnetic component and the valve body are integrated through a molding process; both ends of the air valve stem penetrate through the upper end face and the lower end face of the valve body, respectively, the pressure cap is in snap-fit connection with the upper end of the air valve stem, and a permanent magnet is provided in the pressure cap.

18 Claims, 10 Drawing Sheets

(56) References Cited

U.S. PATENT DOCUMENTS

| | | | | |
|---|---|---|---|---|
| 5,611,370 | A | * | 3/1997 | Najmolhoda ......... F16K 31/062 251/129.08 |
| 5,863,025 | A | * | 1/1999 | Noya ................. F02M 25/0836 123/519 |
| 6,000,417 | A | * | 12/1999 | Jacobs ................. F16K 31/084 137/239 |
| 6,273,396 | B1 | * | 8/2001 | Kato ................... F16K 31/0655 267/180 |
| 6,626,150 | B2 | * | 9/2003 | Palma .................. F02D 33/006 251/129.1 |
| 10,451,464 | B1 | * | 10/2019 | Champaigne ........... F16K 31/10 |
| 2002/0088958 | A1 | * | 7/2002 | Weldon ............. F02M 25/0836 251/129.21 |
| 2002/0112702 | A1 | * | 8/2002 | Weldon ............. F16K 31/0655 123/520 |
| 2003/0102446 | A1 | * | 6/2003 | Krimmer ........... F16K 31/0696 251/50 |
| 2003/0172974 | A1 | * | 9/2003 | Krimmer ........... F16K 31/0655 137/549 |
| 2005/0172999 | A1 | * | 8/2005 | Ohshiro .......... B60K 15/03519 137/202 |
| 2007/0023723 | A1 | * | 2/2007 | Magri ................ F16K 31/0651 251/129.21 |
| 2010/0051114 | A1 | * | 3/2010 | Yamada ................. F16K 24/04 137/202 |
| 2011/0255996 | A1 | * | 10/2011 | Wickstead ............. F16K 15/04 251/129.15 |

\* cited by examiner

INTELLIGENT PRESSURE SOLENOID VALVE

TECHNICAL FIELD

The present disclosure relates to the technical field of a pressure solenoid valve, in particular to an intelligent pressure solenoid valve.

BACKGROUND

Existing cooking appliances, such as electric pressure cooker can include electromagnetic valves, which is designed based on principle that a magnetic valve and an electromagnetic suction cup can generate an attractive force and a repulsive force, which can accomplish automatic adjustment of a pressure limit value of an electric pressure cooker. When the electromagnetic suction cup is not powered on, the limited pressure of the electric pressure cooker is determined by the suction generated by the electromagnetic suction cup and the magnetic valve. After the electromagnetic suction cup is electrified with gradually increasing direct current, the electromagnetic suction cup will generate the same magnetic pole as the adjacent surface of the magnetic valve. The repulsive force of the same magnetic pole will reduce the attractive force between the magnetic valve and the electromagnetic suction cup until the generated repulsive force completely lifts the magnetic valve.

The iron core and the winding of the existing solenoid valve are generally insulated by enameled wires and insulating tapes. The solenoid valve on the electric pressure cooker can easily be penetrated by water vapor, degrading its insulating performance. Water vapor can also rust the iron core, thus affecting the service life of the solenoid valve. The air valve stem, the solenoid valve and the valve component of the existing pressure solenoid valve are all independent components, which need to be assembled multiple times in the assembly process. In particularly, the solenoid valve uses the packing and winding process of an adhesive tape insulation layer. If the adhesive tape insulation layer is broken and damaged, the solenoid valve will also be damaged. When used in the high temperature environment of an electric pressure cooker, serious safety problems arise, severely restricting the service life of the product. Therefore, the existing technology needs to be improve and develope.

SUMMARY

The present disclosure aims to provide an intelligent pressure solenoid valve with a effective structure, good stability, manufacturability and long service life.

In order to achieve the above, the present disclosure uses the following technical scheme.

The present disclosure relates to an intelligent pressure solenoid valve, comprising a valve body, an air valve stem and a pressure cap, wherein the valve body is provided with an electromagnetic component and an air vent, the air vent penetrates through the electromagnetic component, the air valve stem passes through the air vent, and the air valve stem, the electromagnetic component and the valve body are integrated through a molding process; both ends of the air valve stem penetrate through the upper end face and the lower end face of the valve body, respectively, the pressure cap is in snap-fit connection with the upper end of the air valve stem, and a permanent magnet is provided in the pressure cap.

According to the above scheme, the electromagnetic component comprises a keel and an iron core, the keel passes through the valve body and is fixedly connected therewith, a coil is wound around the periphery of the keel, a first through hole is formed in the center of the keel, the iron core passes through the first through hole and is fixedly connected therewith; a second through hole is formed in the center of the iron core, an inner cylinder passes through the second through hole, the inner cylinder is attached to the inner wall of the second through hole of the iron core, and the lower end of the inner cylinder is connected with the lower end of the keel through an extension structure, so that the lower end of the iron core is wrapped.

According to the above scheme, a shielding cover is provided in the valve body, the upper end of the shielding cover is provided with an opening; the lower end face of the keel is abutted against the shielding cover, the lower end face of the shielding cover is provided with a mating hole, the lower end face of the keel is provided with a positioning convex ring, the positioning convex ring is provided around the air vent, and the positioning convex ring passes through the mating hole; the upper end of the iron core is provided with a magnetic suction cup, the magnetic suction cup is provided in the upper end opening of the shielding cover, and the magnetic suction cup is attached to the upper end face of the keel.

According to the above scheme, the inner hole of the inner cylinder forms an air vent, the upper end of the inner cylinder is connected with the valve body, the upper end of the air vent penetrates through the upper end face of the valve body, the lower end of the air vent is connected with a positioning convex ring so as to penetrate through the lower end face of the valve body, and the air valve stem passes through the air vent; the electromagnetic component is provided in the shielding cover, the shielding cover is provided in the valve body, and the valve body connects the electromagnetic component, the shielding cover and the air valve stem on the valve body using a molding process, respectively, to form an integrated structure.

According to the above scheme, the side wall of the air valve stem is provided with a bypass hole, the lower end of the valve body is provided with a pipe joint, one end of the pipe joint is fixedly connected with the valve body, a branch air passage is provided in the pipe joint, one end of the branch air passage is communicated with the bypass hole, and the pipe joint is provided with a pressure sensor.

According to the above scheme, the pipe joint is provided with a hollow sensor base, the upper end of the sensor base is provided with an opening, the pressure sensor is encapsulated and fixed in the upper end opening of the sensor base; the lower end of the sensor base is fixedly connected with the pipe joint, the inner cavity of the sensor base is communicated with the branch air passage, and the other end of the pipe joint is provided with a sealing cover.

According to the above scheme, the pipe joint is provided with a heat sink, one end of the heat sink is fixedly connected with the other end of the pipe joint, the inner cavity of the heat sink is communicated with the other end of the branch air passage, the outer wall of the heat sink is provided with a plurality of radiating fins, the other end of the heat sink is provided with a sensor base, and the pressure sensor is encapsulated on the sensor base.

According to the above scheme, the pressure cap is provided with an exhaust vent, the upper end of the air valve stem is provided with an air nozzle, the air nozzle is installed from the lower end opening of the exhaust vent and passes through the exhaust vent 2, the upper end opening of the exhaust vent is provided with a pressure releasing plate; the bottom surface of the pressure releasing plate is provided with a plug, the plug is movably abutted against the upper end opening of the air nozzle, and the pressure releasing plate is provided with a plurality of pressure releasing holes.

According to the above scheme, the inner wall of the exhaust vent is provided with a bound board, the bound board is provided with a guide opening; the air nozzle movably passes through the guide opening, and the upper end of the air nozzle above the bound board is provided with a falling-off prevention flange.

According to the above scheme, the pressure cap further comprises an exhaust hood, the lower end opening of the exhaust hood is paired with the upper end of the valve body to form a detachable connection, and a sealing washer is provided between the lower end opening of the exhaust hood and the valve body; the pressure cap is movably provided in the exhaust hood and is in snap-fit connection with the air nozzle, and the upper end of the exhaust hood is provided with an air outlet.

According to the above scheme, an impeller is provided in the air outlet, and the impeller is rotatably connected with the exhaust hood.

According to the above scheme, the intelligent pressure solenoid valve is applied to an electric pressure cooker, the valve body is fixedly provided on the cover of the electric pressure cooker, the lower end of the air valve stem passes through the inner cavity of the electric pressure cooker, and the pressure sensor and the electromagnetic component are connected with a main control board of the electric pressure cooker through leads, respectively.

The present disclosure has the following beneficial effect. The present disclosure is reasonable in structure. The valve body encapsulates the electromagnetic component through the molding process. The inner cylinder and the air vent are formed in the valve body. The valve body and the inner cylinder completely wrap the iron core, so as to isolate the iron core from the air vent. The air valve stem passes through the air vent, so as to prevent the iron core from being rusted by water vapor and improve the insulation of the electromagnetic component. The pressure sensor outputs a signal to the main control board of the electric pressure cooker, so that the current direction of the electromagnetic valve changes. The electromagnetic component generates a magnetic force to adsorb or repel, so as to control the pressure cap to suspend or press the pressure cap on an air nozzle, so as to realize the intelligent control of pressure maintaining and pressure releasing of the electric pressure cooker. The heat sink prevents the pressure sensor and the electromagnetic component from overheating, and improves the operating stability of the pressure electromagnetic valve.

valve body; 2. pressure cap; 3. electromagnetic component; 4. pipe joint; 5. electric pressure cooker; 11. air valve stem; 12. air nozzle; 13. falling-off prevention flange; 14. shielding cover; 15. mating hole; 16. bypass hole; 20. impeller; 21. permanent magnet; 22. exhaust vent; 23. pressure releasing plate; 24. plug; 25. bound board; 26. guide opening; 27. exhaust hood; 28. sealing washer; 29. air outlet; 31. air vent; 32. keel; 321. extension structure; 33. iron core; 34. coil; 35. first through hole; 36. second through hole; 37. inner cylinder; 38. magnetic suction cup; 39. positioning convex ring; 41. branch air passage; 42. pressure sensor; 43. sensor base; 44. sealing cover; 45. heat sink; 46. radiating fin.

DETAILED DESCRIPTION OF THE EMBODIMENTS

The technical scheme of the present disclosure will be described with reference to the drawings and embodiments hereinafter.

Embodiment 1

As shown in FIGS. 1-6, the intelligent pressure solenoid valve according to the present disclosure comprises a valve body 1, an air valve stem 11 and a pressure cap 2. The valve body 1 is provided with an electromagnetic component 3 and an air vent 31. The air vent 31 penetrates through the electromagnetic component 3. The air valve stem 11 passes through the air vent 31, and the air valve stem 11, the electromagnetic component 3 and the valve body 1 are integrated through a molding process. Both ends of the air valve stem 11 penetrate through the upper end face and the lower end face of the valve body 1, respectively. The pressure cap 2 is in snap-fit connection with the upper end of the air valve stem 11. A permanent magnet 21 is provided in the pressure cap 2. The intelligent pressure solenoid valve is applied to an electric pressure cooker 5. A pressure releasing channel is provided in the air valve stem 11. The electric pressure cooker 5 communicates the inner cavity of the electric pressure cooker with the outside through the pressure releasing channel. When there is no current in the electromagnetic component 3, the pressure cap 2 exerts a downward acting force on the upper end of the air valve stem 11 under the action of gravity. The acting force makes the pressure cap 2 cover the upper end of the air valve stem 11 to cut off the pressure releasing channel.

When being powered on, the electromagnetic component 3 generates magnetism. When a forward current is introduced to the electromagnetic component 3, the electromagnetic component 3 and the permanent magnet 21 generate an attractive force. The attractive force and gravity are combined to generate a downward covering force, so that the pressure cap 2 cuts off the pressure releasing channel. The pressure in the electric pressure cooker 5 overcomes the above resultant force. The pressure cap 2 is driven to open the pressure releasing channel. The pressure in the electric pressure cooker 5 is discharged to the outside via the pressure releasing channel. When the pressure in the electric pressure cooker 5 drops, the pressure cap 2 cuts off the pressure releasing channel again. The above process is repeated to keep the pressure in the electric pressure cooker 5 constant.

The magnitude of the current introduced into the electromagnetic component 3 is proportional to the set pressure value in the electric pressure cooker 5. The set pressure value in the electric pressure cooker 5 can be adjusted by changing the current value of the electromagnetic component 3. The electromagnetic force generated by the electromagnetic component 3 can be adjusted, thus realizing the stepless adjustment function of the operating pressure intensity of the electric pressure cooker 5.

When a reverse current is introduced to the electromagnetic component 3, the electromagnetic component 3 and the permanent magnet 21 generate a repulsive force. The repulsive force overcomes the gravity generated by the pressure cap 2 to drive the pressure cap 2 to open the pressure releasing channel. The pressure in the electric pressure cooker 5 can be discharged via the pressure releasing channel to achieve the purpose of pressure releasing.

Figure 6:
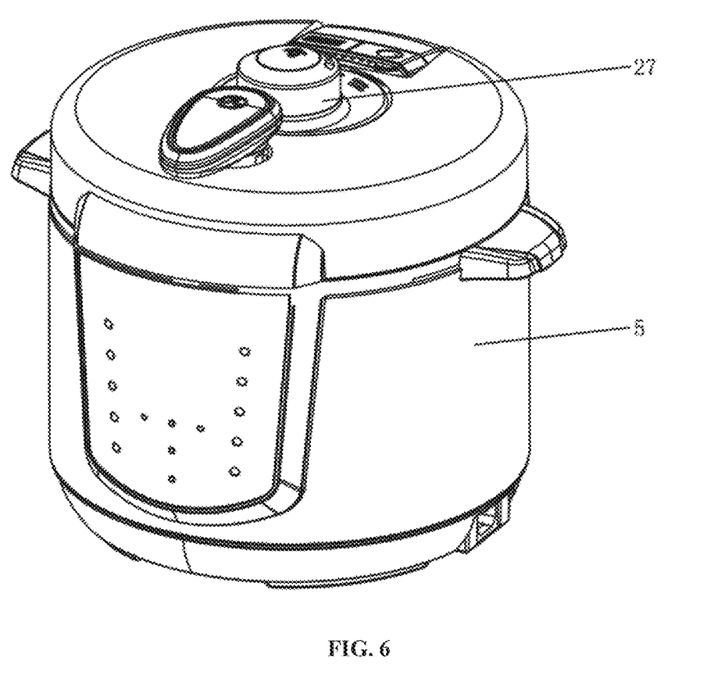
FIG. 6 is a schematic diagram of the application of the present disclosure in an electric pressure cooker.

The valve body 1 is fixedly provided on the cover of the electric pressure cooker 5. The lower end of the air valve stem 11 passes through the inner cavity of the electric pressure cooker 5. The pressure sensor 42 and the electromagnetic component 3 are connected with a main control board of the electric pressure cooker 5 through leads, respectively. The electric pressure cooker 5 is provided with a display module. The display module is connected with the main control board. The pressure sensor 42 can detect the pressure inside the electric pressure cooker 5. The display module can display the set pressure value, the real-time pressure value and the temperature value of the electric pressure cooker 5 in real time.

Figure 1:
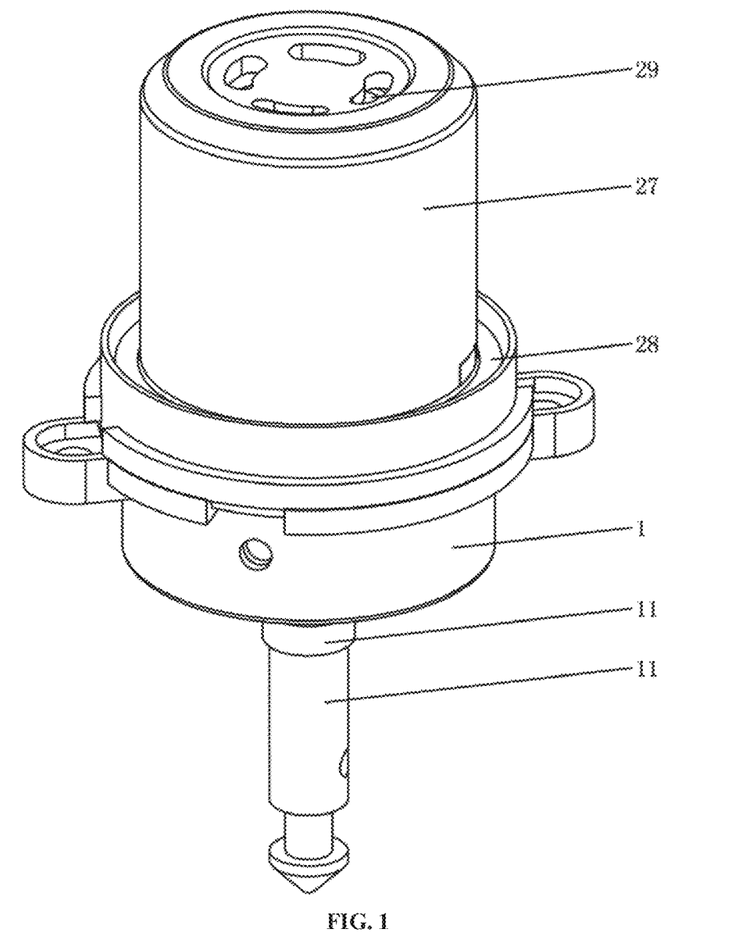
FIG. 1 is a schematic diagram of the overall structure according to Embodiment 1 of the present disclosure.
Figure 2:
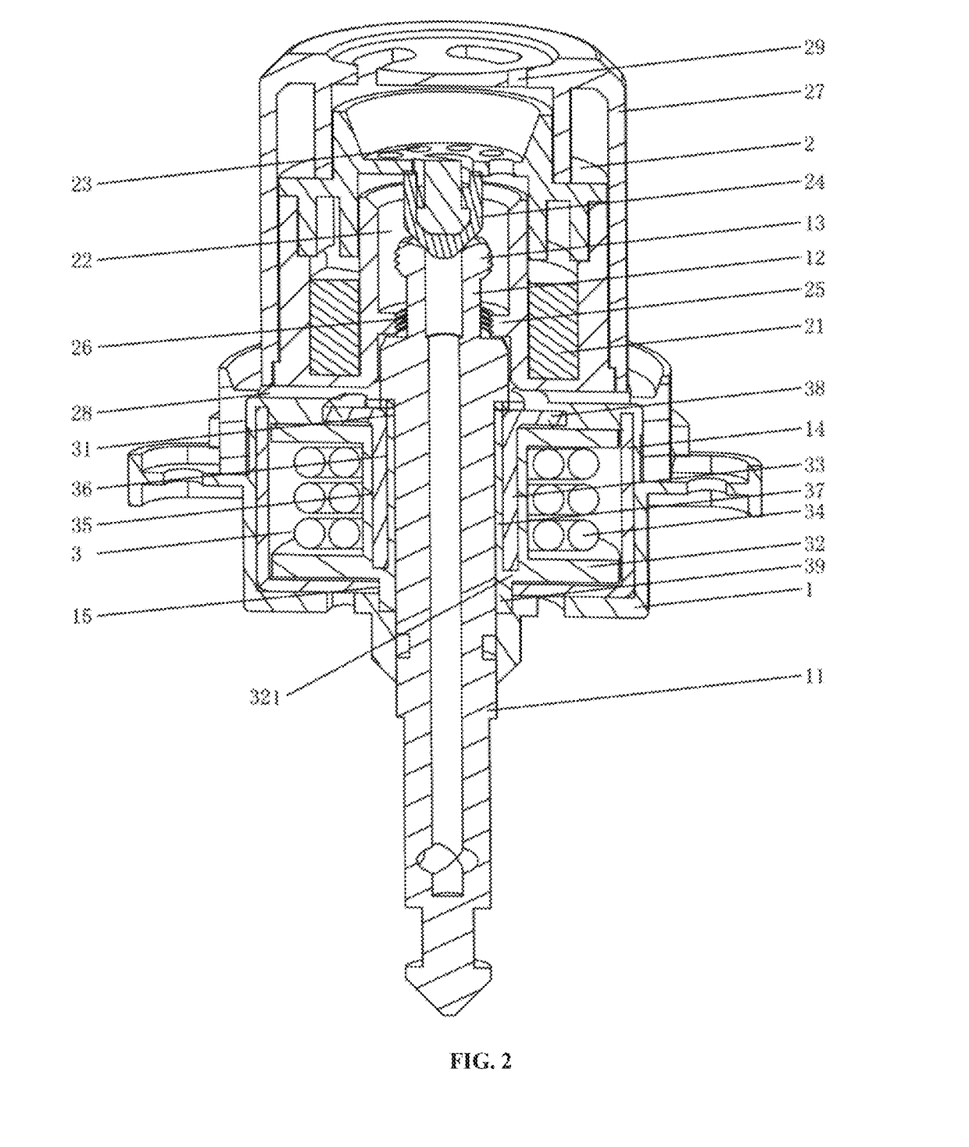
FIG. 2 is a schematic diagram of the overall cross-sectional structure according to Embodiment 1 of the present disclosure.
Figure 3:
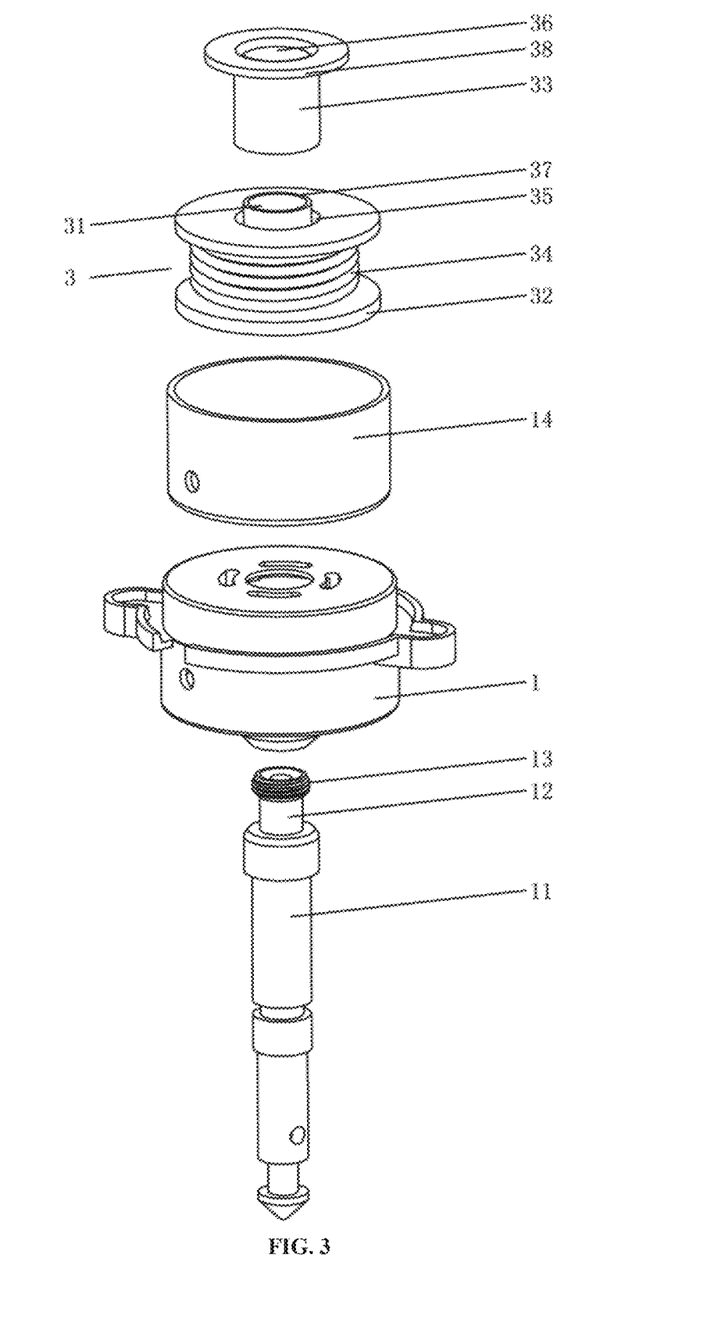
FIG. 3 is a schematic diagram of the cross-sectional structure of a valve body according to Embodiment 1 of the present disclosure.

As shown in FIGS. 2-3, according to the present disclosure, the electromagnetic component 3 preferably comprises a keel 32 and an iron core 33. The keel 32 passes through the valve body 1 and is fixedly connected therewith. A coil 34 is wound around the periphery of the keel 32. A first through hole 35 is formed in the center of the keel 32. The iron core 33 passes through the first through hole 35 and is fixedly connected therewith. A second through hole 36 is formed in the center of the iron core 33. An inner cylinder 37 passes through the second through hole 36. The inner cylinder 37 is attached to the inner wall of the second through hole 36 of the iron core 33. The lower end of the inner cylinder 37 is connected with the lower end of the keel 32 through an extension structure 321, so that the lower end of the iron core 33 is wrapped.

The keel 32 is provided on the iron core 33 by an injection molding process, so that the iron core 33 passes through the first through hole 35 between the keel 32 and the inner cylinder 37. The molding process forms an extension structure 321 between the lower end of the inner cylinder 37 and the lower end of the keel 32 to wrap the lower end of the iron core 33, while the valve body 1 is integrated so that the upper end of the inner cylinder 37 is connected with the upper end surface of the valve body 1 to wrap the upper end of the iron core 33. Furthermore, the valve body 1 is wrapped on the electromagnetic component 3 by a secondary molding process, so that the iron core 33 is completely wrapped to improve the insulation, preventing the problem that the iron core 33 is rusted by water vapor. Further, the inner cylinder 37 is provided with an air vent 31. The air valve stem 11 passes through the air vent 31. The air vent 31 and the electromagnetic component 3 are isolated by the inner cylinder 37, so that water vapor is prevented from entering to influence the insulating performance of the electromagnetic component 3, and the insulating performance of the pressure solenoid valve is better.

A shielding cover 14 is provided in the valve body 1. The upper end of the shielding cover 14 is provided with an opening. The lower end face of the keel 32 is abutted against the shielding cover 14. The lower end face of the shielding cover 14 is provided with a mating hole 15. The lower end face of the keel 32 is provided with a positioning convex ring 39. The positioning convex ring 39 is provided around the air vent 31, and the positioning convex ring 39 passes through the mating hole 15. The upper end of the iron core 33 is provided with a magnetic suction cup 38. The magnetic suction cup 38 is provided in the upper end opening of the shielding cover 14, and the magnetic suction cup 38 is attached to the upper end face of the keel 32. The shielding cover 14 is used to block the magnetism of the lower end of the iron core 33. The coil 34 is powered on, so that the iron core 33 generates magnetism, and the magnetic suction cup 38 at the upper end of the iron core 33 generates corresponding magnetic poles and magnetic forces. The pressure cap 2 generates corresponding blocking pressure on the upper end of the air valve stem 11 in cooperation with the permanent magnet 21.

The inner hole of the inner cylinder 37 forms an air vent 31. The upper end of the inner cylinder 37 is connected with the valve body 1. Further, the upper end of the air vent 31 penetrates through the upper end face of the valve body 1. The lower end of the air vent 31 is connected with a positioning convex ring 39 so as to penetrate through the lower end face of the valve body 1. The air valve stem 11 passes through the air vent 31. The electromagnetic component 3 is provided in the shielding cover 14. The shielding cover 14 is provided in the valve body 1. The valve body 1 connects the electromagnetic component 3, the shielding cover 14 and the air valve stem 11 on the valve body using a molding process, respectively, to form an integrated structure. The keel 32 is wrapped on the iron core 33 using a molding process, and is assembled into the electromagnetic component 3 after winding the coil 34. After the electromagnetic component 3 is installed in the shielding cover 14, the positioning convex ring 39 is concentrically provided in cooperation with the mating hole 15. The air valve stem 11 is installed in the air vent 31 in the inner cylinder 37, so as to carry out a secondary molding processing of the valve body 1. The bottom surface of the mold of the valve body 1 is provided with a plurality of bumps that are abutted against the lower end face of the shielding cover 14 to support and position the shielding cover. The upper and lower ends of the air valve stem 11 are clamped by the mold to form a central position. Insulating materials are injected into the cavity of the mold to wrap the shielding cover 14 and the electromagnetic component 3, and the insulating materials fill the gap between the shielding cover 14 and the electromagnetic component 3, thus forming the valve body 1. The valve body 1 formed by a secondary molding process can effectively improve the insulating performance of the electromagnetic component 3 therein, and improve the stability and service life of the pressure solenoid valve.

As shown in FIG. 2, the pressure cap 2 is provided with an exhaust vent 22. The upper end of the air valve stem 11 is provided with an air nozzle 12. The air nozzle 12 is installed from the lower end opening of the exhaust vent 22 and passes through the exhaust vent 22. The upper end opening of the exhaust vent 22 is provided with a pressure releasing plate 23. The bottom surface of the pressure releasing plate 23 is provided with a plug 24. The plug 24 is movably abutted against the upper end opening of the air nozzle 12, and the pressure releasing plate 23 is provided with a plurality of pressure releasing holes. The plug 24 can use a conical structure, while the upper end opening of the air nozzle 12 uses a trumpet shape. The air nozzle 12 passes through the exhaust vent 22 so that the pressure cap 2 is movable up and down along the air nozzle 12. Under the action of gravity for the pressure cap 2, the plug 24 on the pressure releasing plate 23 can block the air nozzle 12. When the pressure intensity in the air valve stem 11 exceeds the acting force generated by the electromagnetic component 3, the pressure cap 2 is lifted by the air pressure, and the pressure in the electric pressure cooker 5 is discharged to the outside via the air valve stem 11, the air nozzle 12 and the air vent 22 to release the pressure.

The inner wall of the exhaust vent 22 is provided with a bound board 25. The bound board 25 is provided with a guide opening 26. The air nozzle 12 movably passes through the guide opening 26, and the upper end of the air nozzle 12 above the bound board 25 is provided with a falling-off prevention flange 13. The bound board 25 can be made of elastic material, so that the falling-off prevention flange 13 passes through the guide opening 26 during installation. The bound board 25 is used to limit the pressure cap 2 to prevent the pressure cap from falling off the air nozzle 12 under the pressure impact. Furthermore, the falling-off prevention flange 13 can use a threaded structure, and the guide opening 26 is provided with an internal thread. The pressure cap 2 can be screwed into and assembled on the air nozzle 12. The falling-off prevention flange 13 and the bound board 25 can only be separated by screw fit, so that the pressure cap 2 can be prevented from falling off the air nozzle 12 under the impact force.

Figure 4:
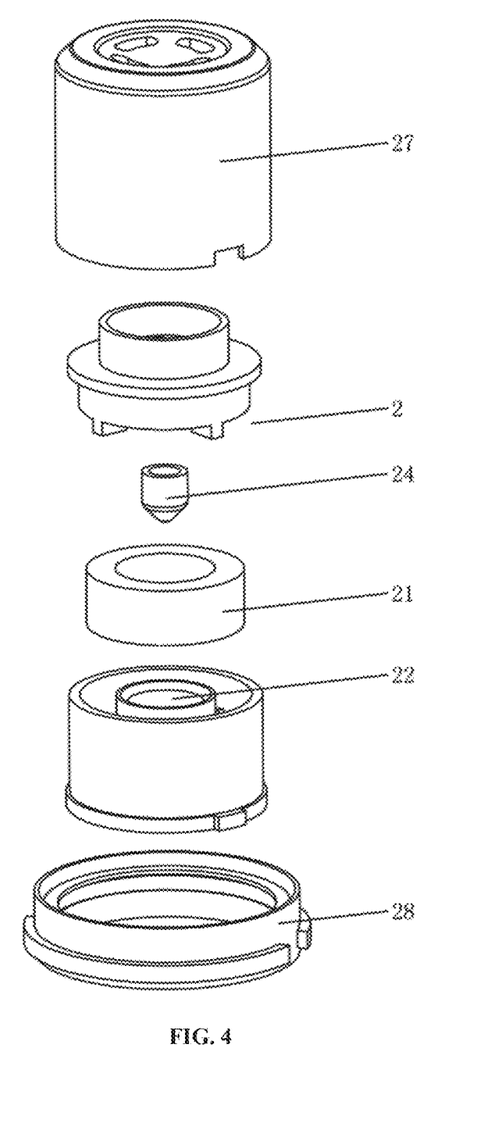
FIG. 4 is a schematic diagram of the disassembly structure of a pressure cap according to Embodiment 1 of the present disclosure.

As shown in FIG. 4, the pressure cap 2 further comprises an exhaust hood 27. The lower end opening of the exhaust hood 27 is paired with the upper end of the valve body 1 to form a detachable connection, and a sealing washer 28 is provided between the lower end opening of the exhaust hood 27 and the valve body 1. The pressure cap 2 is movably provided in the exhaust hood 27 and is in snap-fit connection with the air nozzle 12. The upper end of the exhaust hood 27 is provided with an air outlet 29. The outer edge of the upper end of the valve body 1 is provided with a boss to form an interference fit in cooperation with the lower end opening of the exhaust hood 27. The sealing performance between the exhaust hood 27 and the valve body 1 is improved by a sealing washer 28. The airflow discharged from the air nozzle 12 enters the inner cavity of the exhaust hood 27 first for buffering, and then is discharged to the outside through the air outlet 29.

Embodiment 2

Figure 5:
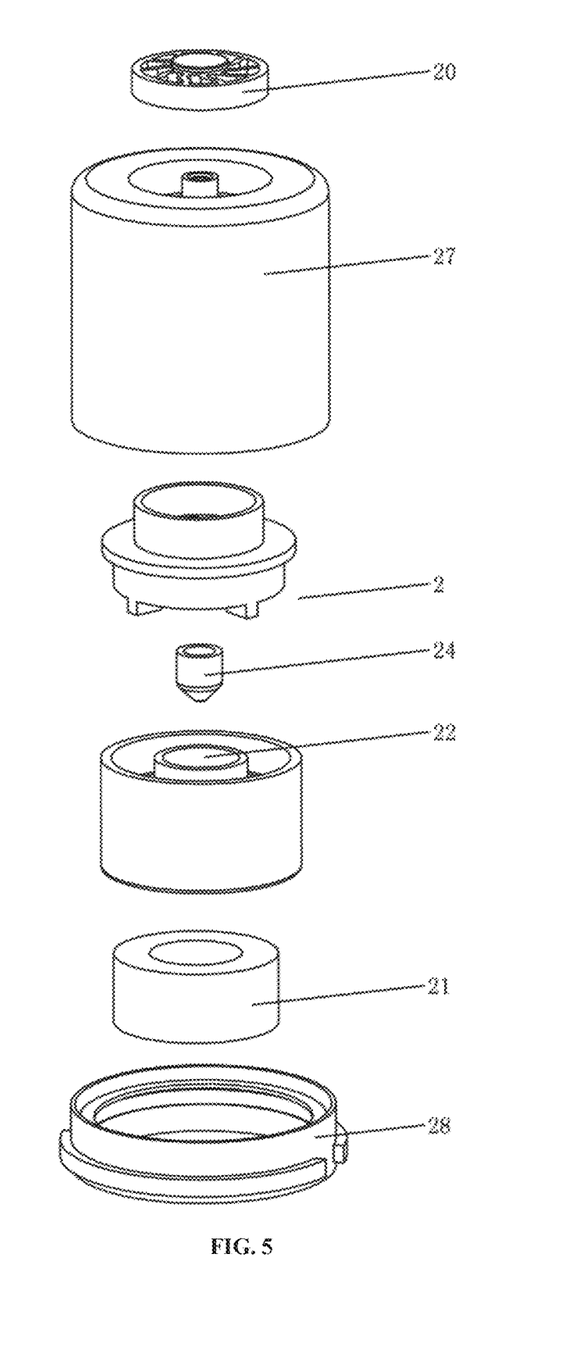
FIG. 5 is a schematic diagram of the disassembly structure of a pressure cap according to Embodiment 2 of the present disclosure.

As shown in FIG. 5, the difference between this embodiment and Embodiment 1 is only that an impeller 20 is provided in the air outlet 29, and the impeller 20 is rotatably connected with the exhaust hood 27. The high-temperature gas in the exhaust hood 27 is ejected through the air outlet 29. The speed is high when the high-temperature gas flow passes through the air outlet 29. The impeller 20 is driven by the high-temperature gas flow to rotate quickly, which can break up the high-temperature gas flow ejected from the air outlet 29 to prevent the direct injection of the gas flow, and avoid the potential safety hazard caused by the high-temperature and high-speed gas flow.

Embodiment 3

Figure 7:
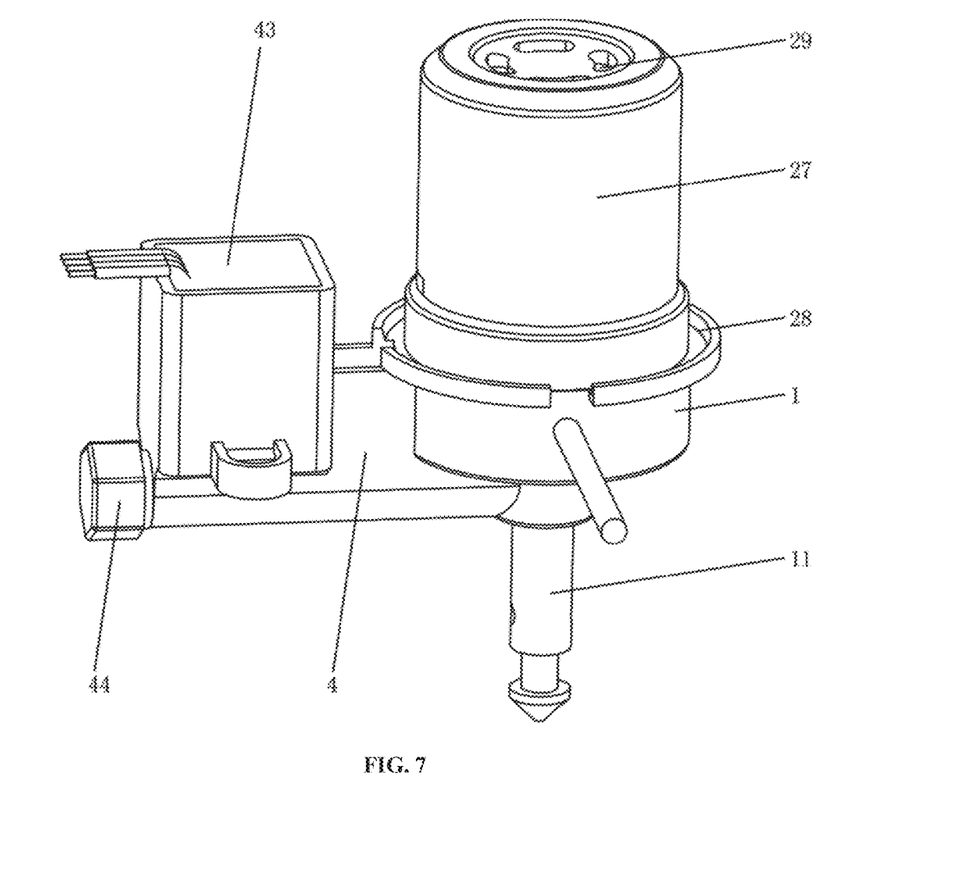
FIG. 7 is a schematic diagram of the overall structure according to Embodiment 3 of the present disclosure.
Figure 8:
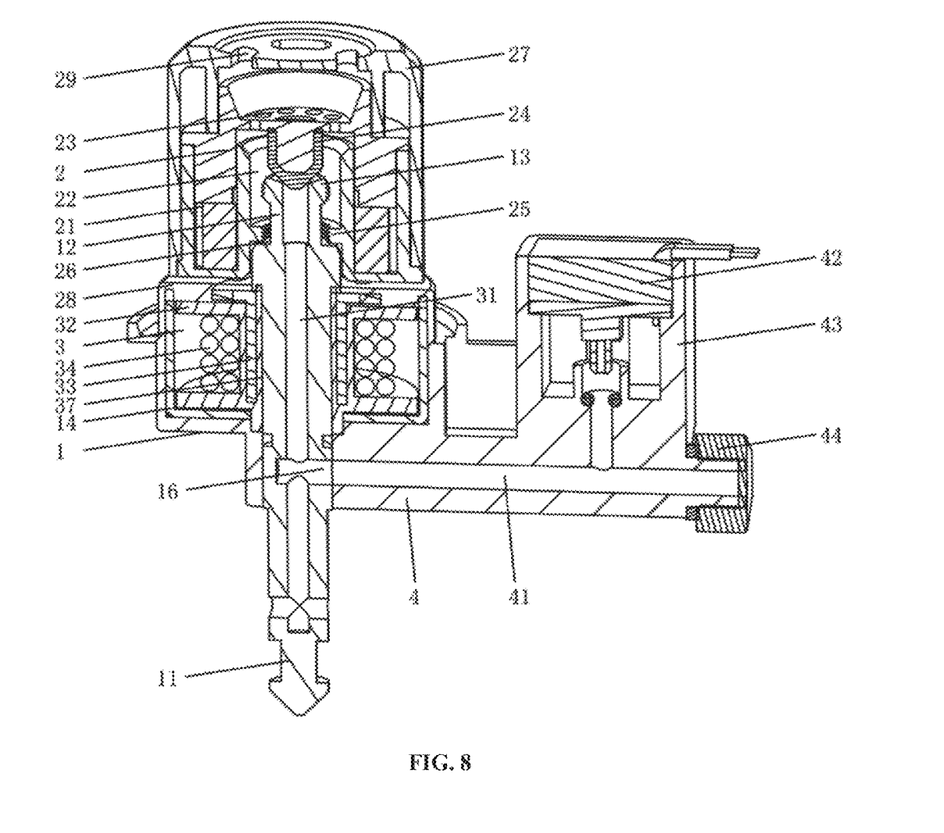
FIG. 8 is a schematic diagram of the overall cross-sectional structure according to Embodiment 3 of the present disclosure.

As shown in FIGS. 7-8, the difference between this embodiment and Embodiment 1 is only that the side wall of the air valve stem 11 is provided with a bypass hole 16. The lower end of the valve body 1 is provided with a pipe joint 4. One end of the pipe joint 4 is fixedly connected with the valve body 1. A branch air passage 41 is provided in the pipe joint 4. One end of the branch air passage 41 is communicated with the bypass hole 16. The pipe joint 4 is provided with a pressure sensor 42. The branch air passage 41 is communicated with the pressure releasing channel in the air valve stem 11 through the bypass hole 16. The pressure sensor 42 detects the pressure in the branch air passage 41 to monitor the pressure intensity in the electric pressure cooker 5 in real time. The pressure sensor 42 and the electromagnetic component 3 are both connected to the main control board of the electric pressure cooker 5, so that the operating pressure of the electric pressure cooker 5 can be automatically controlled and adjustable.

The operating principle of the electric pressure cooker is as follows. The pressure sensor 42 monitors the real-time air pressure in the electric pressure cooker 5, sets the operating air pressure of the electric pressure cooker 5 according to different food materials, applies rated voltage to the electromagnetic component 3 during operation, and attracts the pressure cap 2 by the magnetization of the coil 34. When the pressure in the electric pressure cooker 5 exceeds the set pressure, the pressure sensor 42 will output a frequency signal or a voltage signal to a single chip microcomputer on a central control panel. The central control board receives the signal to change the current direction in the electromagnetic component 3, so that the electromagnetic component 3 generates a repulsive force to suspend the pressure cap 2, the pressure in the electric pressure cooker 5 can be released through the air valve stem 11, and the intelligent control of the pressure maintaining and pressure releasing of the electric pressure cooker 5 is realized. A voltage instability alarm signal module is integrated in the central control panel of the electric pressure cooker 5. The central control panel has its own single chip microcomputer with air pressure calibration to ensure the operating accuracy of the pressure solenoid valve.

The pipe joint 4 is provided with a hollow sensor base 43. The upper end of the sensor base 43 is provided with an opening. The pressure sensor 42 is encapsulated and fixed in the upper end opening of the sensor base 43. The lower end of the sensor base 43 is fixedly connected with the pipe joint 4. The inner cavity of the sensor base 43 is communicated with the branch air passage 41, and the other end of the pipe joint 4 is provided with a sealing cover 44. The sensor base 43 is used to encapsulate the pressure sensor 42 in the upper end opening thereof. The lower end of the air valve stem 11 is communicated with the inner cavity of the electric pressure cooker 5. The pressure intensity in the electric pressure cooker 5 is communicated into the sensor base 43 via the pressure releasing channel, the bypass hole 16 and the branch air passage 41. The pressure sensor 42 monitors the pressure intensity in real time. The branch air passage 41 is transversely provided on the pipe joint 4, and the pressure sensor 41 is provided in the upper end opening of the sensor base 42. Condensed water generated by water vapor entering the branch air passage 41 can flow back into the electric pressure cooker 5, so as to prevent the water vapor from affecting the operating accuracy of the pressure sensor 41. Alternatively, the sealing cover 44 on the pipe joint 4 is opened to clean the branch air passage 41, so as to prevent affecting the sensing accuracy of the pressure sensor 42 due to the blockage of the branch air passage 41.

Embodiment 4

Figure 9:
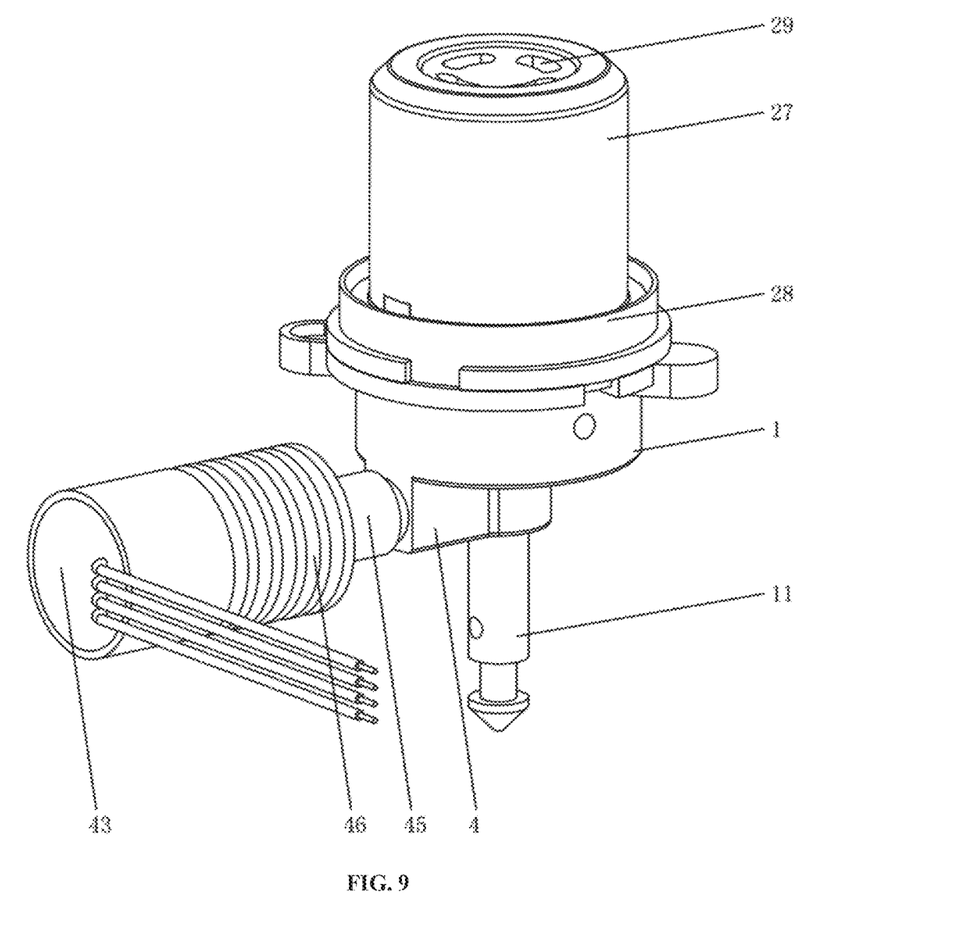
FIG. 9 is a schematic diagram of the overall structure according to Embodiment 4 of the present disclosure.
Figure 10:
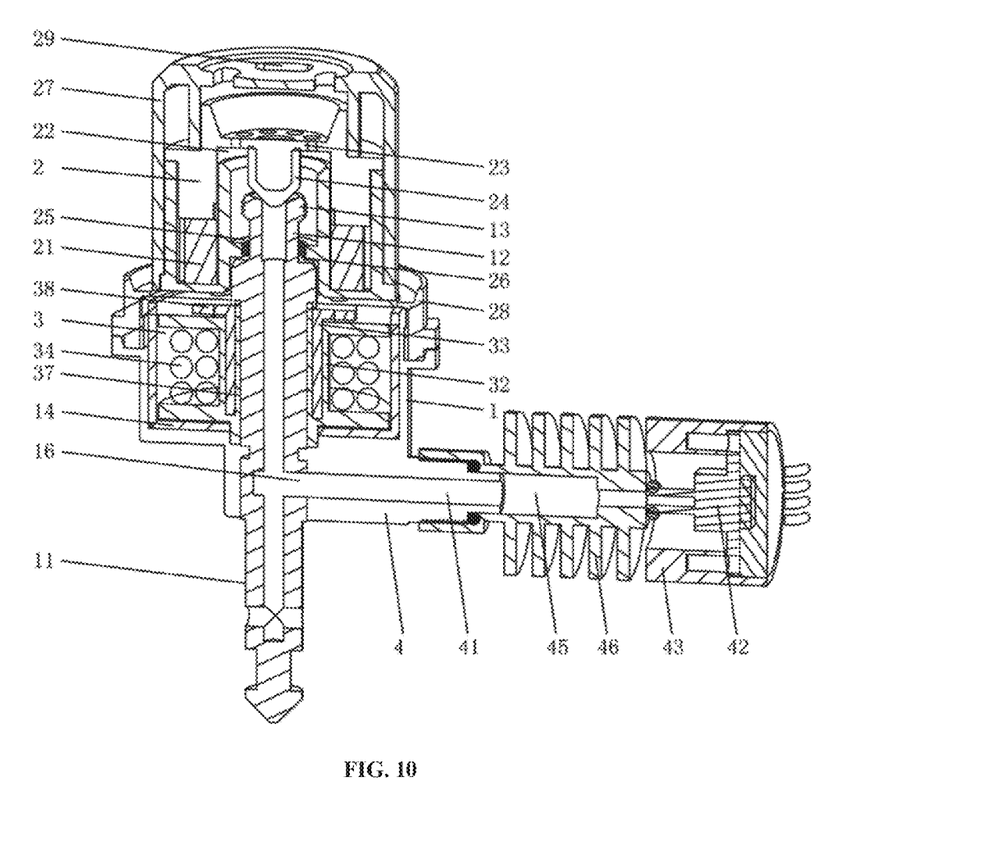
FIG. 10 is a schematic diagram of the overall cross-sectional structure according to Embodiment 4 of the present disclosure.

As shown in FIGS. 9-10, the difference between this embodiment and Embodiment 1 is only that the pipe joint 4 is provided with a heat sink 45. One end of the heat sink 45 is fixedly connected with the other end of the pipe joint 4. The inner cavity of the heat sink 45 is communicated with the other end of the branch air passage 41. The outer wall of the heat sink 45 is provided with a plurality of radiating fins 46. The other end of the heat sink 45 is provided with a sensor base 43, and the pressure sensor 42 is encapsulated on the sensor base 43.

The pressure sensor 41 can detect the pressure intensity in the electric pressure cooker 6. Both the pressure sensor 41 and the electromagnetic component 3 are connected to a control module, so that the operating pressure of the electric pressure cooker 6 can be automatically controlled and adjustable. Particularly, the pressure sensor 41 is provided on the heat sink 45 to avoid high temperature and improve the stability of the pressure sensor 41.

According to the present disclosure, the pressure sensor 42 monitors the real-time air pressure in the electric pressure cooker 5, sets the operating air pressure of the electric pressure cooker 5 according to different food materials, applies rated voltage to the electromagnetic component 3 during operation, and attracts the pressure cap 2 by the magnetization of the coil 34. When the pressure in the electric pressure cooker 5 exceeds the set pressure, the pressure sensor 42 will output a frequency signal or a voltage signal to a single chip microcomputer on a central control panel. The central control board receives the signal to change the current direction in the electromagnetic component 3, so that the electromagnetic component 3 generates a repulsive force to suspend the pressure cap 2, the pressure in the electric pressure cooker 5 can be released through the air valve stem 11, and the intelligent control of the pressure maintaining and pressure releasing of the electric pressure cooker 5 is realized. A voltage instability alarm signal module is integrated in the central control panel of the electric pressure cooker 5. The central control panel has its own single chip microcomputer with air pressure calibration to ensure the operating accuracy of the pressure solenoid valve. The heat sink 45 can control the steam temperature within the temperature range of the pressure sensor 42 to ensure the operating accuracy of the pressure sensor 41.

The radiating fins 46 can reduce the temperature of the installation position of the pressure sensor 42, reduce the influence of high temperature on the pressure sensor 42, and improve the operating stability thereof. It can be understood that one end of the pipe joint 4 is molded and communicated with the bypass hole 16, and the junction between the heat sink 45 and the pipe joint 4 is provided with a sealing ring to ensure the sealing performance.

The above are only the preferred embodiments of the present disclosure, so that all equivalent changes or modifications made according to the structures, characteristics and principles described in the patent application scope of the present disclosure are included in the patent application scope of the present disclosure.

What is claimed is:

1. An intelligent pressure solenoid valve, comprising a valve body (1), an air valve stem (11) and a pressure cap (2), wherein the valve body (1) is provided with an electromagnetic component (3) and an air vent (31), wherein the air vent (31) penetrates through the electromagnetic component (3), wherein the air valve stem (11) passes through the air vent (31); wherein two ends of the air valve stem (11) respectively extend past an upper end face and a lower end face of the valve body (1), wherein the pressure cap (2) is in snap-fit connection with an upper end of the air valve stem (11), and wherein a permanent magnet (21) is provided in the pressure cap (2);

wherein the pressure cap (2) is provided with an exhaust vent (22), wherein the upper end of the air valve stem (11) is provided with an air nozzle (12), wherein the air nozzle (12) is installed from a lower end opening of the exhaust vent (22) and passes through the exhaust vent (22), wherein an upper end opening of the exhaust vent (22) is provided with a pressure releasing plate (23); wherein a bottom surface of the pressure releasing plate (23) is provided with a plug (24), wherein the plug (24) is movably abutted against an upper end opening of the air nozzle (12), and wherein the pressure releasing plate (23) is provided with a plurality of pressure releasing holes.

2. The intelligent pressure solenoid valve according to claim 1, wherein the electromagnetic component (3) further comprising a keel (32) and an iron core (33), wherein the keel (32) passes through the valve body (1) and is fixedly connected therewith, wherein a coil (34) is wound around a periphery of the keel (32), wherein a first through hole (35) is formed in a center of the keel (32), wherein the iron core (33) passes through the first through hole (35) and is fixedly connected therewith; wherein a second through hole (36) is formed in a center of the iron core (33), wherein an inner cylinder (37) passes through the second through hole (36), wherein the inner cylinder (37) is attached to an inner wall of the second through hole (36) of the iron core (33), and wherein a lower end of the inner cylinder (37) is connected with a lower end of the keel (32) through an extension structure (321), wherein the extension structure (321) seals a lower end of the first through hole (35).

3. The intelligent pressure solenoid valve according to claim 2, wherein a shielding cover (14) is provided in the valve body (1), wherein an upper end of the shielding cover (14) is provided with an opening; wherein a lower end face of the keel (32) is abutted against the shielding cover (14), wherein a lower end face of the shielding cover (14) is provided with a mating hole (15), wherein the lower end face of the keel (32) is provided with a positioning convex ring (39), wherein the positioning convex ring (39) passes through the mating hole (15); wherein an upper end of the iron core (33) is provided with a magnetic suction cup (38), wherein the magnetic suction cup (38) is provided in the upper end opening of the shielding cover (14), and wherein the magnetic suction cup (38) is attached to an upper end face of the keel (32).

4. The intelligent pressure solenoid valve according to claim 3, wherein the air vent is formed by an inner hole of the inner cylinder (37), wherein an upper end of the inner cylinder (37) is connected with the valve body (1), wherein an upper end of the air vent (31) penetrates through the upper end face of the valve body (1), wherein a lower end of the air vent (31) is connected with the positioning convex ring (39) and penetrates through the lower end face of the valve body (1), wherein the air valve stem (11) passes through the air vent (31); wherein the electromagnetic component (3) is provided in the shielding cover (14), wherein the shielding cover (14) is provided in the valve body (1).

5. The intelligent pressure solenoid valve according to claim 4, wherein the intelligent pressure solenoid valve is used on an electric pressure cooker (5), wherein the valve body (1) is fixedly provided on a cover of the electric pressure cooker (5), wherein a lower end of the air valve stem (11) passes through an inner cavity of the electric pressure cooker (5), and wherein a pressure sensor (42) and the electromagnetic component (3) are connected with a main control board of the electric pressure cooker (5) through leads.

6. The intelligent pressure solenoid valve according to any of claim 2, wherein the intelligent pressure solenoid valve is used on an electric pressure cooker (5), wherein the valve body (1) is fixedly provided on a cover of the electric pressure cooker (5), wherein a lower end of the air valve stem (11) passes through an inner cavity of the electric pressure cooker (5), and wherein a pressure sensor (42) and the electromagnetic component (3) are connected with a main control board of the electric pressure cooker (5) through leads.

7. The intelligent pressure solenoid valve according to any of claim 3, wherein the intelligent pressure solenoid valve is used on an electric pressure cooker (5), wherein the valve body (1) is fixedly provided on a cover of the electric pressure cooker (5), wherein a lower end of the air valve stem (11) passes through an inner cavity of the electric pressure cooker (5), and wherein a pressure sensor (42) and the electromagnetic component (3) are connected with a main control board of the electric pressure cooker (5) through leads.

8. The intelligent pressure solenoid valve according to claim 1, wherein a side wall of the air valve stem (11) is provided with a bypass hole (16), wherein a lower end of the valve body (1) is provided with a pipe joint (4), wherein one end of the pipe joint (4) is fixedly connected with the valve body (1), wherein a branch air passage (41) is provided in the pipe joint (4), wherein one end of the branch air passage (41) is connected with the bypass hole (16), and wherein the pipe joint (4) is provided with a pressure sensor (42).

9. The intelligent pressure solenoid valve according to claim 8, wherein the pipe joint (4) is provided with a hollow sensor base (43), wherein an upper end of the sensor base (43) is provided with an opening, wherein the pressure sensor (42) is encapsulated and fixed in an upper end opening of the sensor base (43); wherein a lower end of the sensor base (43) is fixedly connected with the pipe joint (4), wherein an inner cavity of the sensor base (43) is communicated with the branch air passage (41), and wherein another end of the pipe joint (4) is provided with a sealing cover (44).

10. The intelligent pressure solenoid valve according to claim 9, wherein the intelligent pressure solenoid valve is used on an electric pressure cooker (5), wherein the valve body (1) is fixedly provided on a cover of the electric pressure cooker (5), wherein a lower end of the air valve stem (11) passes through an inner cavity of the electric pressure cooker (5), and wherein the pressure sensor (42) and the electromagnetic component (3) are connected with a main control board of the electric pressure cooker (5) through leads.

11. The intelligent pressure solenoid valve according to claim 8, wherein the pipe joint (4) is provided with a heat sink (45), wherein one end of the heat sink (45) is fixedly connected with one end of the pipe joint (4), wherein an inner cavity of the heat sink (45) is connected to one end of the branch air passage (41), wherein an outer wall of the heat sink (45) is provided with a plurality of radiating fins (46), wherein another end of the heat sink (45) is provided with a sensor base (43), and wherein the pressure sensor (42) is encapsulated on the sensor base (43).

12. The intelligent pressure solenoid valve according to claim 11, wherein the intelligent pressure solenoid valve is used on an electric pressure cooker (5), wherein the valve body (1) is fixedly provided on a cover of the electric pressure cooker (5), wherein a lower end of the air valve stem (11) passes through an inner cavity of the electric pressure cooker (5), and wherein the pressure sensor (42) and the electromagnetic component (3) are connected with a main control board of the electric pressure cooker (5) through leads.

13. The intelligent pressure solenoid valve according to claim 8, wherein the intelligent pressure solenoid valve is used on an electric pressure cooker (5), wherein the valve body (1) is fixedly provided on a cover of the electric pressure cooker (5), wherein a lower end of the air valve stem (11) passes through an inner cavity of the electric pressure cooker (5), and wherein the pressure sensor (42) and the electromagnetic component (3) are connected with a main control board of the electric pressure cooker (5) through leads.

14. The intelligent pressure solenoid valve according to claim 1, wherein an inner wall of the exhaust vent (22) is provided with a bound board (25), wherein the bound board (25) is provided with a guide opening (26); wherein the air nozzle (12) movably passes through the guide opening (26), and wherein an upper end of the air nozzle (12) above the bound board (25) is provided with a falling-off prevention flange (13), wherein the bound board (25) is used to limit the pressure cap (2) to prevent the pressure cap (2) from falling off the air nozzle (12).

15. The intelligent pressure solenoid valve according to claim 14, wherein the intelligent pressure solenoid valve is used on an electric pressure cooker (5), wherein the valve body (1) is fixedly provided on a cover of the electric pressure cooker (5), wherein a lower end of the air valve stem (11) passes through an inner cavity of the electric pressure cooker (5), and wherein a pressure sensor (42) and the electromagnetic component (3) are connected with a main control board of the electric pressure cooker (5) through leads.

16. The intelligent pressure solenoid valve according to claim 1, wherein the pressure cap (2) further comprises an exhaust hood (27), wherein a lower end opening of the exhaust hood (27) is paired with an upper end of the valve body (1) to form a detachable connection; wherein a sealing washer (28) is provided between a lower end opening of the exhaust hood (27) and the valve body (1); wherein the pressure cap (2) is movably provided in the exhaust hood (27) and is in snap-fit connection with the air nozzle (12); and wherein an upper end of the exhaust hood (27) is provided with an air outlet (29).

17. The intelligent pressure solenoid valve according to claim 16, wherein an impeller (20) is provided in the air outlet (29), and the impeller (20) is rotatably connected with the exhaust hood (27).

18. The intelligent pressure solenoid valve according to any of claim 1, wherein the intelligent pressure solenoid valve is used on an electric pressure cooker (5), wherein the valve body (1) is fixedly provided on a cover of the electric pressure cooker (5), wherein a lower end of the air valve stem (11) passes through an inner cavity of the electric pressure cooker (5), and wherein a pressure sensor (42) and the electromagnetic component (3) are connected with a main control board of the electric pressure cooker (5) through leads.

* * * * *